United States Patent [19]

Young et al.

[11] 4,050,181
[45] Sept. 27, 1977

[54] ARTIFICIAL FISHING WORM

[76] Inventors: Walter M. Young, 27 Anderson St., Piedmont, S.C. 29673; Robert S. Young, Rte. 1, Pelzer, S.C. 29669

[21] Appl. No.: 670,264

[22] Filed: Mar. 25, 1976

[51] Int. Cl.² ............................................. A01K 85/01
[52] U.S. Cl. ................................. 43/42.06; 43/42.24
[58] Field of Search ................. 43/42.06, 44.99, 42.53, 43/42.37, 42.28, 42.31, 42.24

[56] References Cited

U.S. PATENT DOCUMENTS

| 3,514,358 | 5/1970 | Monaghan | 43/42.53 |
| 3,802,115 | 4/1974 | Auten et al. | 43/42.53 |

Primary Examiner—Russell R. Kinsey
Assistant Examiner—Peter K. Skiff
Attorney, Agent, or Firm—Bailey, Dority & Flint

[57] ABSTRACT

An artificial fishing lure provided for receiving a tablet which generates gas when contacted by water so that when the lure is pulled through the water, bubbles are generated as the tablet dissolves for attracting the attention of fish. The lure includes an elongated body member having a circular cross-section with an enlarged portion adjacent the center thereof. An elongated slot extends through the enlarged portion into which the tablet is carried. The body member is constructed of resilient flexible material for securely holding the tablet as such dissolves.

1 Claim, 5 Drawing Figures

ARTIFICIAL FISHING WORM

BACKGROUND OF THE INVENTION

The present invention relates to a fishing lure and, more particularly, to an elongated flexible fishing lure such as generally referred to as a "fishing worm" which has an enlarged central portion with a slot molded therein for receiving an effervescent tablet.

Examples of fishing lures in which tablets are placed for generating gas when coming in contact with water are illustrated in U.S. Pat. Nos. 3,105,317 and 2,803,915.

In U.S. Pat. No. 3,105,317, pliable lures representing crayfish, frogs, worms, etc. are provided with a cavity into which a gas generating tablet is placed. Tubular passageways extend through the pliable lure through which water is suppose to pass for contacting the tablet. When the water contacts the tablet, it generates a stream of gas bubbles which are expelled through various passages.

In U.S. Pat. No. 2,803,915, there is illustrated a fishing lure which is suppose to simulate an injured frog. This lure has a cavity provided therein into which a gas generating tablet is carried. As the tablet contacts the water, bubbles are expelled through the bottom thereof for imparting movement to the lure.

Other similar fishing lures and aquatic toys are illustrated in U.S. Pat. Nos. 2,599,128, 2,932,916, and 2,833,216.

While in some instances, the above described devices may be satisfactory for the purpose intended, it has been found that it is more desirable to have a fishing lure which generates streams of bubbles that are expelled from the rear of the lure when the lure is running beneath the water.

SUMMARY OF THE INVENTION

This invention includes an artificial lure provided for receiving a tablet which generates a gas when contacted by water so that when the lure is pulled through the water, bubbles are generated as the tablet dissolves for attracting the attention of fish. The lure includes an elongated body member having a circular cross-section with the cross-section adjacent the front portion being larger than the cross-section adjacent the tail portion. There is a substantial taper from adjacent the front of the body member towards the tail portion. An enlarged portion is provided adjacent the central portion of the elongated member. An elongated slot extends through this enlarged portion with the surfaces adjacent the ends of the slot being smooth and rounded producing a complementary seat for the tablet. The lure is molded of a flexible material so that when the tablet is placed in the slot, the surfaces on opposite sides of the slot are stretched securely holding the tablet therebetween even as the tablet dissolves.

Accordingly, it is an important object of the present invention to provide a fishing lure which securely holds a tablet for generating gas bubbles as the lure is pulled through the water.

Another important object of the present invention is to provide an elongated fishing lure simulating an artificial fishing worm into which a gas generating tablet can be positioned while exposing portions of the tablet to water.

Still another important object of the present invention is to provide an artificial lure in the form of a plastic worm which has a molded elongated slot provided therein which has smooth, rounded surfaces to minimize tearing when an effervescent tablet is positioned therein.

These and other objects and advantages of the invention will become apparent upon reference to the following specification, attendant claims and drawing.

DESCRIPTION OF A PREFERRED EMBODIMENT

Figure 1:
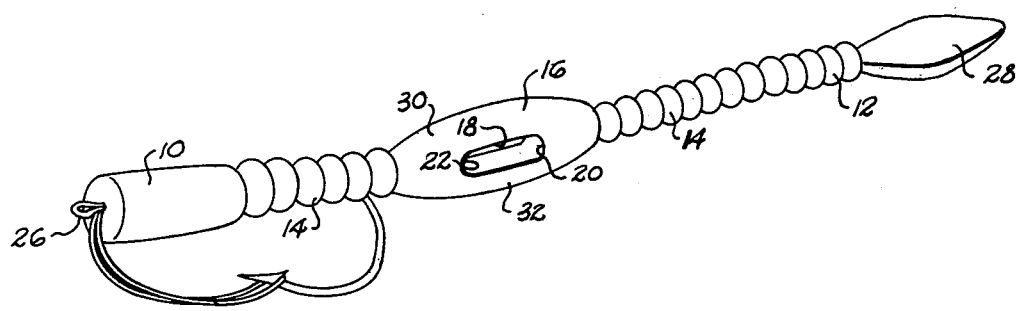
FIG. 1 is an enlarged perpsective view illustrating a plastic worm constructed in accordance with the present invention.

Referring in more detail to the drawing, there is illustrated in FIG. 1 an artificial fishing lure generally referred to as a plastic worm. The lure includes an elongated body member having a circular cross-section. The cross-section adjacent the front portion 10 of the worm is larger than the cross-section adjacent the rear portion 12. There is a slight taper from adjacent the front portion 10 to adjacent the rear portion 12. Ridges 14 extend around portions of the elongated body for simulating the segments of a worm.

An enlarged body portion 16 is carried adjacent the central portion of the lure. Interposed in this enlarged body portion is a molded elongated slot 18. The surfaces 20 and 22 adjacent the ends of the slot are smooth and continuous so as to minimize tearing when a tablet 24 is inserted therein. Any suitable conventional hook such as the weedless hook 26 may be utilized in conjunction with the lure. In one particular worm, the end 28 thereof is flattened.

The tablet 24 is an effervescent tablet which generates gas when contacted by water. Various artificial scents and flavors can be added to the tablet so that as it generates gas bubbles when contacted by water, the various flavors and scents are produced.

Figures 2, 4:
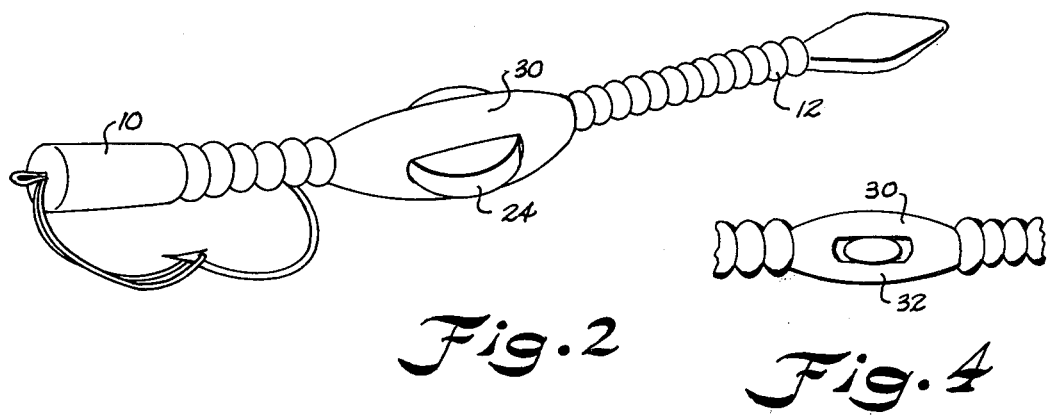
FIG. 2 is an enlarged perspective view illustrating the plastic worm constructed in accordance with the present invention with a gas generating tablet provided therein.
FIG. 4 is a side elevational view illustrating the worm with a partially dissolved tablet carried within a slot provided therein.
Figures 3, 5:
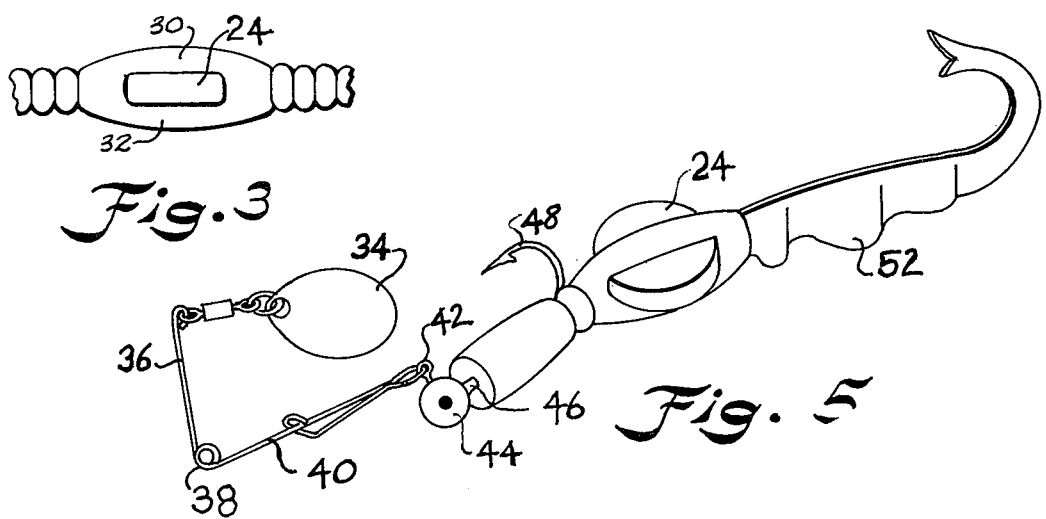
FIG. 3 is a side elevational view illustrating a portion of a plastic worm with a tablet carried therein.
FIG. 5 is a perspective view illustrating a modified form of the invention.

As can be seen, in FIG. 3, the walls 30 and 32 which surround the tablet 24 when such is placed within the slot 18 are stretched so as to securely hold the tablet therein. As the tablet dissolves, the walls 30 and 32 resume their normal position such as illustrated in FIG. 4 always holding the tablet therebetween until the tablet is completely dissolved.

This enables the lure to be cast and pulled through the water without the tablet dropping out of the slot.

The lure may be constructed of any suitable conventional material such as is now being utilized for manufacturing plastic worms as long as the material is soft and pliable and maintains sufficient resiliency so as to hold the tablet 24 within the slot as it dissolves. One particular worm includes 100 parts of vinyl dispersion resin; 450–600 parts of vinyl plasticizer and 3–10 parts of a vinyl stabilizer.

FIG. 5 illustrates the worm forming part of a spinner bait. The spinner bait includes a spinner 34 which is rotatably carried on an upper end of arm 36. A loop 38 is provided in the lower end of the arm through which the fishing line is attached. Extending rearwardly from the loop 38 is a clip extension 40 which extends through an eyelet 42 carried on a lead head 44. The lead head 44 includes a rearwardly extending portion 46 which terminates in a hook portion 48. The rearwardly extending porton 46 extends through a front portion 50 of a worm. The slot into which the tappit 24 is carried is the same as the slot of the worms illustrated in FIGS. 1 and 2. The end of the worm is a relatively flat vertically extending member such as illustrated at 52 which wiggles as it is drawn through the water. The worm illustrated in FIG. 5 is constructed of the same material as those illustrated in FIGS. 1 through 4.

While a preferred embodiment of the invention has been described using specific terms, such description is for illustrative purposes only, and it is to be understood that changes and variations may be made without departing from the spirit or scope of the following claims.

What is claimed is:

1. An artificial fishing lure comprising, an elongated body member having a substantially circular cross section adjacent a front portion, said cross section adjacent said front portion being larger than the cross section adjacent the tail portion with there being a substantial taper from adjacent said front portion to said tail portion, an enlarged portion adjacent the central portion of said elongated member, an elongated slot extending through said enlarged portion with the surfaces adjacent the ends of said slot being smooth and rounded a tablet which generates a gas when contacted by water carried in said elongated slot, and said slot being substantially rectangular with the width being less than the diameter of said tablet so that said tablet extends out beyond the sides of said lure for being exposed to water when said lure is drawn through said water, said lure being molded of a flexible material so that the surfaces on opposite sides of said slot are stretched securely holding said tablet therebetween even as said tablet dissolves.

* * * * *